United States Patent
Shishikura et al.

(10) Patent No.: US 6,488,416 B1
(45) Date of Patent: Dec. 3, 2002

(54) OPTICAL MODULE, BOARD MOUNTED OPTICAL MODULE, AND ASSEMBLY METHOD OF OPTICAL MODULE

(75) Inventors: Masato Shishikura, Hachioji (JP); Koji Yoshida, Kokubunji (JP); Kimio Tatsuno, Tokyo (JP); Hirohisa Sano, Niiza (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 09/662,338

(22) Filed: Sep. 14, 2000

(30) Foreign Application Priority Data

Oct. 14, 1999 (JP) .......................... 11-291806

(51) Int. Cl.⁷ ................................. G02B 6/42
(52) U.S. Cl. ........................... 385/88; 385/92
(58) Field of Search .................. 385/88–94, 49; 359/152

(56) References Cited

U.S. PATENT DOCUMENTS

| | | | | |
|---|---|---|---|---|
| 6,024,500 A | * | 2/2000 | Wolf ........................... | 385/92 |
| 6,181,854 B1 | * | 1/2001 | Kojima et al. ................ | 385/49 |
| 6,264,481 B1 | * | 7/2001 | Kozel et al. .................. | 439/92 |

FOREIGN PATENT DOCUMENTS

| JP | 5057746 | 9/1993 |
|---|---|---|
| JP | 5335603 | 12/1993 |
| JP | 815578 | 8/1996 |

OTHER PUBLICATIONS

"A Surface Mount Single–Mode Laser Module Using Passive Alignment" by Kurata, et al pp. 524–5 (No Date).

MT–RJ Small Form Factor Transceivers, "Small Form Factor Package" Hewlett Packard (No Date).

* cited by examiner

Primary Examiner—John D. Lee
Assistant Examiner—Scott A Knauss
(74) Attorney, Agent, or Firm—Antonelli, Terry, Stout & Kraus, LLP

(57) ABSTRACT

A conventional problem is to provide an optical module capable of being reflow mounted together with electronic components collectively, and, at the same time, securing a mechanical strength that can bear a large stress at the time of an attachment/detachment of the optical fiber. A solution to the above-mentioned problem can be attained by using an optical connector removable type optical module for reflow mounting having a fixing structure for fixing itself to a mount board, including a receptacle part installed to an optical module 19 to which an optical connector 1 is detachably connected; electric terminals 4 for reflow mounting that are arranged corresponding to lands 8 on a mount board 6; and stud parts 5 that are able to fit in fixing holes 7 on the mount board 6.

2 Claims, 11 Drawing Sheets

OPTICAL MODULE, BOARD MOUNTED OPTICAL MODULE, AND ASSEMBLY METHOD OF OPTICAL MODULE

BACKGROUND OF THE INVENTION

The present invention relates to an optical module, a board mounted optical module, and method of assembly of an optical module. More specifically, the invention relates to an optical module for transmitting or receiving an optical signal, and a board mounted optical module of this kind, and to a method of assembly of an optical module of this kind.

Because of explosive use of the Internet and portable telephones, the construction of optical communication systems that offer high speed and large capacity have been promoted rapidly, and, hence, an even further reduction in the cost of optical components that are to be used in such systems is desired. On the other hand, in the board mounting process, since the jackets of optical fibers used in the optical modules have a low heat resistance, it is difficult to employ the convenient, low-cost reflow mounting process with the use of solder (i.e. mounting a component on a mount board by the solder reflow process) that is widely used in mounting electronic components. For this reason, although it becomes costly, a technique of individually mounting, only the optical modules has been adopted. Moreover, since it is difficult to automate a process of reeling the optical fiber on the mount board, the assembly process was complicated.

Figure 1:
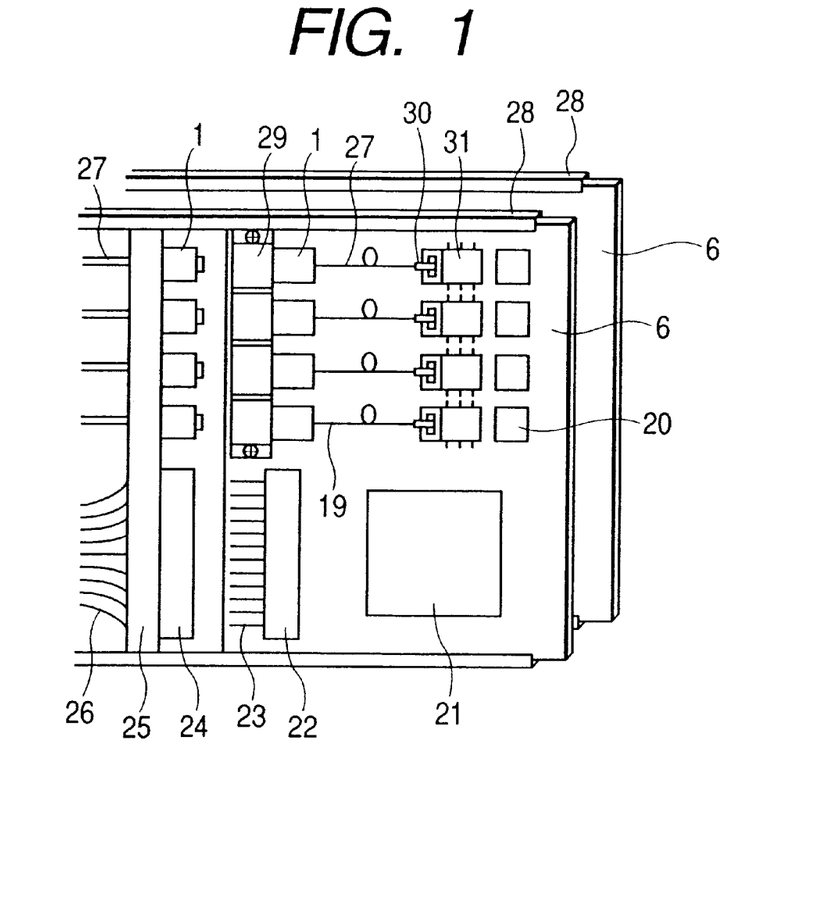
FIG. 1 is a perspective view of one example of conventional optical communication equipment.

K. Kurata et al. have reported an optical module, which has a simplified connector structure that enables an optical fiber to be detachably connected and which is compliant with the mounting process using reflow soldering (hereinafter referred to as "compliant with the reflow mounting process"), in IEEE Trans. CPMT, vol.19, p.524 (1966). FIG. 1 herein shows an example of board mounting with the use of an optical module, as described above, which is compliant with the reflow mounting process, and the housing configuration of the mount boards in optical transmission equipment. Optical modules 31 compliant with the reflow mounting process together with electronic components, such as an IC 20, an IC 21, etc., are mounted on a mount board 6 collectively by the solder reflow process. An electric connector 22, which has electric connection pins 23, is mounted on the mount board 6, and an adapter 29 for optical connection is fixed to the mount board 6 with screws. After that, a simplified connector 30 terminating an optical fiber 27 for a module is attached to the optical module 31, and a standard optical connector 1 that terminates the other end of the fiber is inserted in the adapter 29. Then, the mount board 6 on which each component is mounted is inserted along guides 28 mounted on the enclosure of the optical communication equipment to establish a connection between the adapter 29 for optical contact and the standard optical connector 1 of the optical fiber 27 supported on a connector fixed post 25 of the enclosure, as well as the connection between the electric connection pins 23 and an electric connector 24 of the electric wiring 26 supported on the same.

This structure has the following features.

(1) The optical module 31 and the electronic components can be reflow mounted collectively on the mount board 6.
(2) The adapter 29 for achieving optical contact is fixed on the mount board 6 with screws.
(3) The simplified connector 30 of the optical module 31 and the adapter 29 for optical contact are connected with the optical fiber 27.

More specifically, the simplified connector 30 attached to one end of this fiber 27 and the optical module 31 are optically connected, and the standard optical connector 1 provided at the other end thereof is optically connected to the optical adapter 29.

In structures like this, because the optical fiber is detachably connected and the structure is compliant with the reflow mounting process, there is the advantage that the optical modules can be reflow mounted with electronic components collectively. However, since the fiber 27 intervenes between the optical module 31 and the adapter 29, there is a problem that the reeling process for supply of the fiber 27 is troublesome. Moreover, since this configuration requires a portion where the fiber 27 is arranged, there is a problem that the mount board becomes larger by that amount, which is contrary to the object of miniaturization of the optical module.

Here, the reason for providing the fiber 27 in this way can be ascribed to the following fact. In the above-described optical module 31, which is devised to be compliant with the reflow mounting process, the mechanical fixation strength to the mount board for direct optical connection with an enclosure is structurally insufficient. Therefore, this module doesn't accommodate a receptacle part which a normal optical connector is directly attached to and detached from. That is, in this construction, attachment/detachment of the normal optical connector 1 is performed through the intermediary of the separately provided optical adapter 29.

Figure 2:
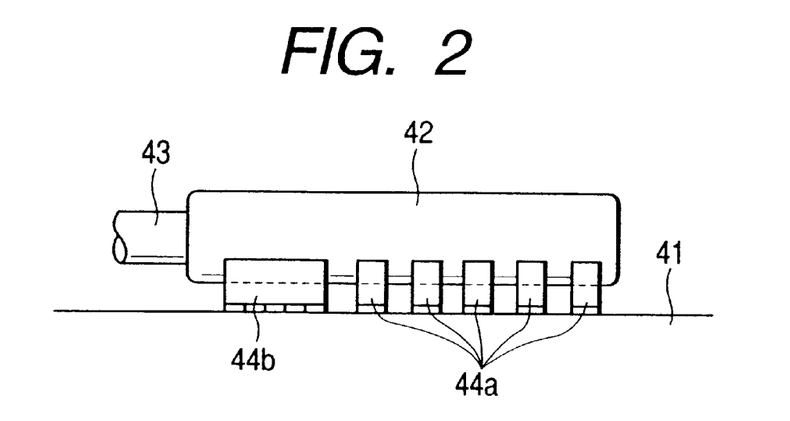
FIG. 2 is a front view of one example of the conventional optical communication equipment.

Moreover, in the optical module described in Japanese Patent Prepublication No. 5-335603, the optical module has a plate-like connection part that contacts a wide area of the mount board during the reflow process in order to increase the mechanical connection strength to the mount board. FIG. 2 shows its structure. A package main body 42 is provided with an optical connector 43 capable of being detachably connected to an external optical connector, and further comprises lead parts 44a for making connection with a circuit board 41 and a plate-like connection part 44b that is to be soldered to the circuit board 41 during the reflow process and that has a large contact area to reinforce the mechanical connection strength. However, it is difficult to miniaturize this optical module because the connection part 44b having a large contact area needs to be mounted on the circuit board, and it is likely that the module may move in the plane of the board during the reflow process; therefore this, module is not suitable for connection with an enclosure that uses a multiplex connector.

On the other hand, the optical module disclosed in the Japanese Patent Prepublication No. 8-57746 and the optical module disclosed in the Japanese Patent Prepublication No. 8-15578 have receptacle structures that allow the attachment/detachment of optical fibers with respect to the main bodies, wherein both electric wiring pins and stud pins for fixing the receptacle part ensure the mechanical strength that can stand a stress at the time of the attachment/detachment of the optical fiber. Although the problem of the reeling process in the supply of optical fiber is solved in the optical modules as described above, the optical module needs to be mounted separately and so it is difficult to mount the optical module together with electronic components collectively using the solder reflow process.

SUMMARY OF THE INVENTION

With the above-mentioned conventional technology, by providing an attaching/detaching mechanism for an optical fiber whose heat resistance is low and a reflow mounting mechanism, the optical fiber together with the electronic components can be reflow mounted collectively. However, as shown in FIG. 1, in such an example where a large stress is applied to the optical module when the mount board is attached to and detached from the enclosure, the reflow mounting only by soldering is considered to be insufficient in terms of the mechanical fixation strength of the optical module to the mount board. Therefore, to circumvent this problem, a configuration is adopted wherein an optical adapter for external connection is provided separately and this adapter is connected to the optical module via an optical fiber. Now, with this structure, a step for connection of an optical fiber will newly occur, and hence the troublesome reeling process in the supply of the optical fiber and the screw fastening process of the optical adapter still remains necessary. Consequently, with this structure, it is difficult to reduce the cost of mounting. Furthermore, it is very likely that the height and the horizontal location of the optical modules may vary when being mounted on a mount board. Especially, when a multiplex optical connector is used, there is a concern that the stress may increase at the time of the attachment/detachment of the optical fiber because of the variation of relative positions of the receptacle parts.

On the other hand, in the above-mentioned conventional technology for mounting the optical module whereby the optical module main body is fixed by electric terminal pins and stud pins, the mechanical strength at the time of the attachment/detachment of the optical fiber is sufficient. However, there exists a problem in that the collective reflow mounting of the optical module together with the other electronic components is difficult due to its pin structure.

It is an object of the present invention to provide an optical module etc. which is capable of being reflow mounted on a mount board (hereinafter referred to as "reflow-mounted on a board") together with electronic components collectively and securing a mechanical strength that can bear a large stress at the time of the attachment/detachment of the optical fiber. With this construction, a low-cost mounting of the optical module can be realized, eliminating problems, such as troublesome screw fastening of the optical module, the reeling process of the optical fiber, etc. Furthermore, a structure is provided whereby the height and the horizontal position of the optical module can be controlled accurately when being reflow mounted, especially suppressing the stress of the optical module at the time of the attachment/detachment of the multiplex optical connector.

Firstly, terms are defined.

A stud means a pillar (a structure for supporting something).

A land means a printed wire part on the board to which a component is to be soldered when a tip component etc. is mounted on the board by soldering. This is a normally used term in the technical filled of solder mounting etc. In the reflow surface mounting, the term land indicates an island part on which solder is printed.

Figure 3:
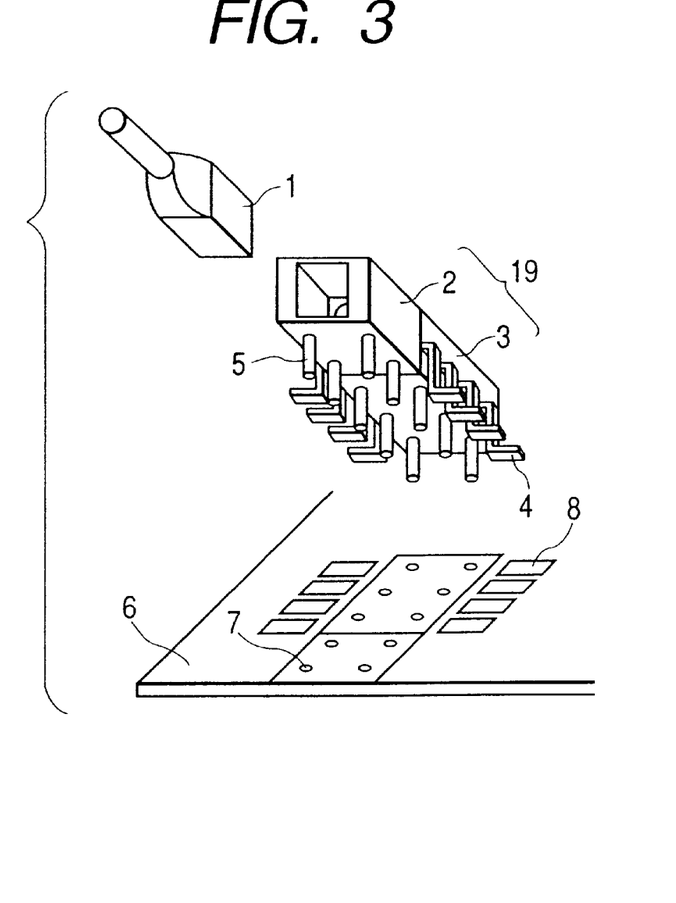
FIG. 3 is an exploded perspective view of one embodiment of the optical module according to the present invention.
Figure 4:
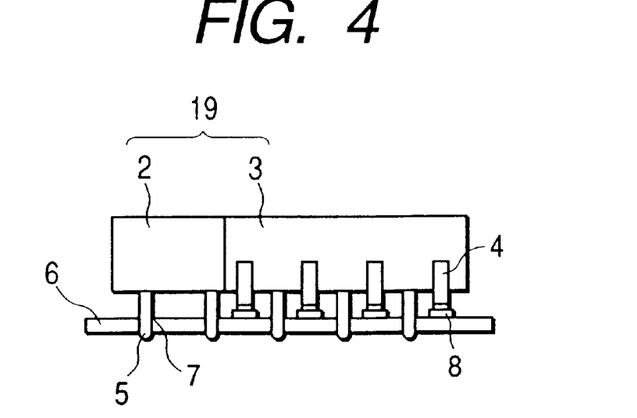
FIG. 4 is a front view of one embodiment of the optical module according to the present invention with a cross section of the mount board.

The means for solving the problem is as follows.ps
(1) FIG. 3 and FIG. 4 show a typical construction. In these figures, an optical module 19 is provided with a receptacle part 2 to which the optical connector 1 is detachably connected. This optical module 19 is provided with electric terminals 4 that can be surface mounted on the mount board 6. The electric terminals 4 are located in positions corresponding to lands 8 on the mount board 6. The optical module 19 is provided with stud parts 5. On the mount board 6, fixing holes 7 are provided for securing the optical module 19 on the mount board 6 through the intermediaries of the studs 5 thereof, and the holes 7 are constructed so as to fit the studs 5. In this construction, the studs 5 of the optical module 19 are made to fit in the mount board 6, and then solder between the electric terminals 4 and the lands 8 is melted, whereby the optical module 19 is reflow mounted on the mount board 6. According to such a construction, the above-mentioned problem can be eliminated, and hence the object of the present invention can be achieved.

(2) In such a structure, more specifically, it is also possible to adopt a construction wherein the studs 5 are formed together with the receptacle parts 2 and the optical module main body 3 in a single structural combination. Here, it is requisite to provide the stud parts 5 on the optical module main body 3, but it is optional to provide the stud parts 5 also on the receptacle part 2. Naturally, the optional provision is more effective.

(3) Moreover, it is also possible to form the stud part 5, the receptacle part 2, and the optical module main body 3 into a single structural combination with a resin material or a plastic material.

(4) Preferably, the number of studs 5 is three or more. The larger the number, the more desirable the studs are to fulfill the original function of the stud.

Figure 5:
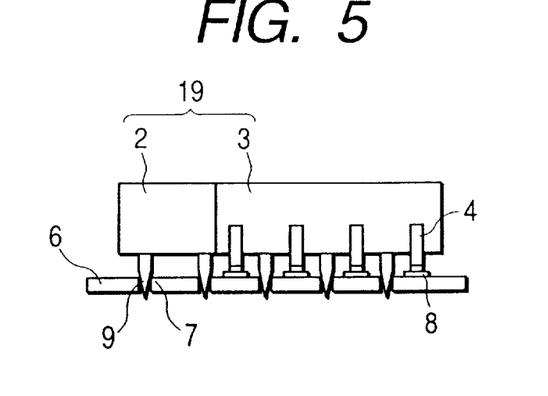
FIG. 5 is a front view of one embodiment of the optical module according to the present invention with a cross section of the mount board.

(5) As shown in FIG. 5, forming stud parts 9 into a taper shape is a feature of one embodiment of the present invention.

Figure 6:
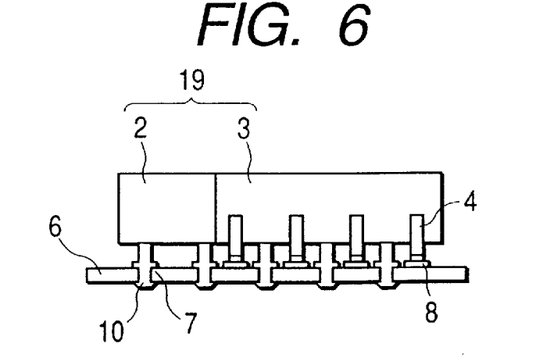
FIG. 6 is a front view of one embodiment of the optical module according to the present invention with a cross section of the mount board.

(6) As shown in FIG. 6, it is also possible to adopt a construction where stud parts 10 fit the fixing holes 7 of the mount board 6 and each stud 10 is provided with flanges. When a stud 10 is inserted in a hole 7, both sides of the mount board 6 contact those flanges, and thereby the stud 10 is made to fit in the mount board 6.

Figure 7:
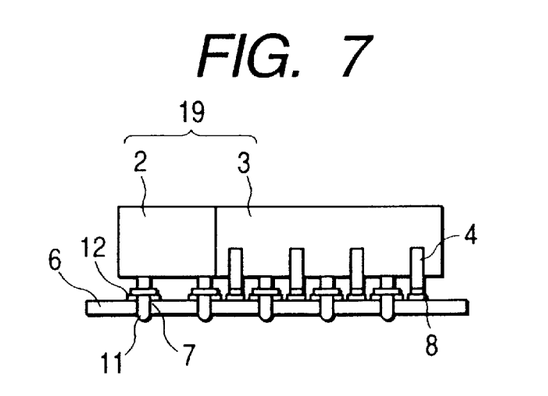
FIG. 7 is a front view of one embodiment of the optical module according to the present invention with a cross section of the mount board.

(7) It is also possible to adopt a construction, as shown in FIG. 7, where stud parts 11 with a flange fit the fixing holes 7 of the mount board 6. The flange is formed so as to contact one of the planes of the mount board 6.

Figure 8:
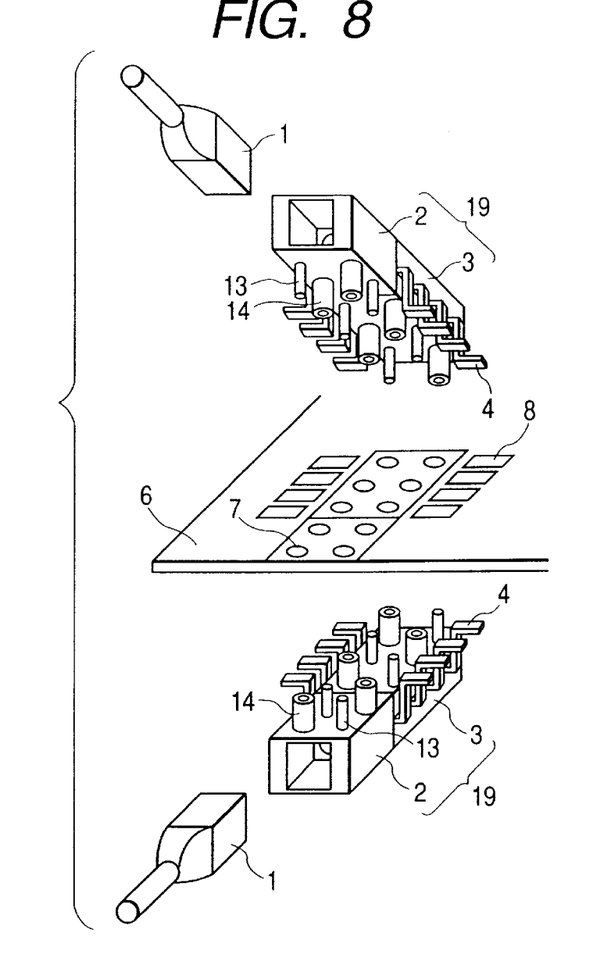
FIG. 8 is an exploded perspective view of one embodiment of the optical module according to the present invention.
Figure 9:
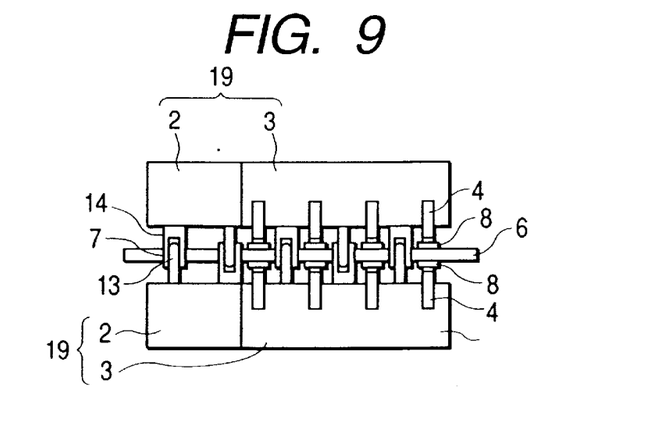
FIG. 9 is a front view of one embodiment of the optical module according to the present invention with a cross section of the mount board.

(8) It is also possible to adopt a configuration where stud parts 13 and stud parts 14, each one of which is able to fit the other, are provided on the optical modules, as shown in FIG. 8 and FIG. 9, and when the two optical modules 19 are mounted on the front side and on the rear side of the mount board 6 through the intermediaries of the fixing holes 7, the two stud parts 13, 14 of the two optical modules 19 fit together to effect the fixation of the two optical modules an the mount board 6.

Figure 10:
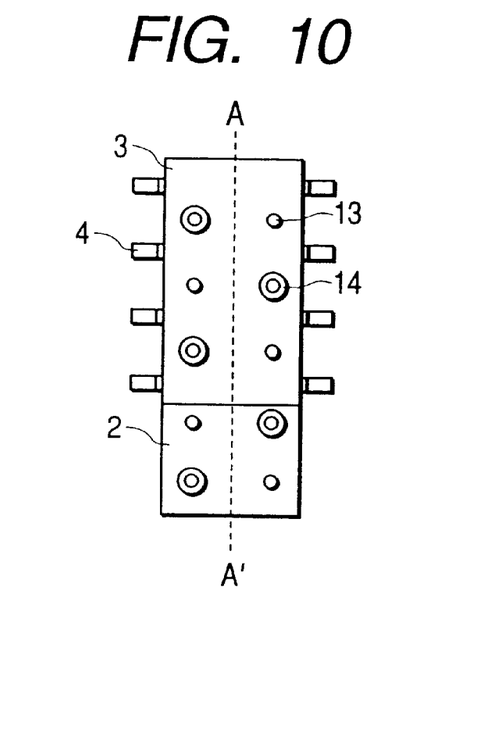
FIG. 10 is a bottom view of the one embodiment of the optical module according to the present invention.
Figure 11:
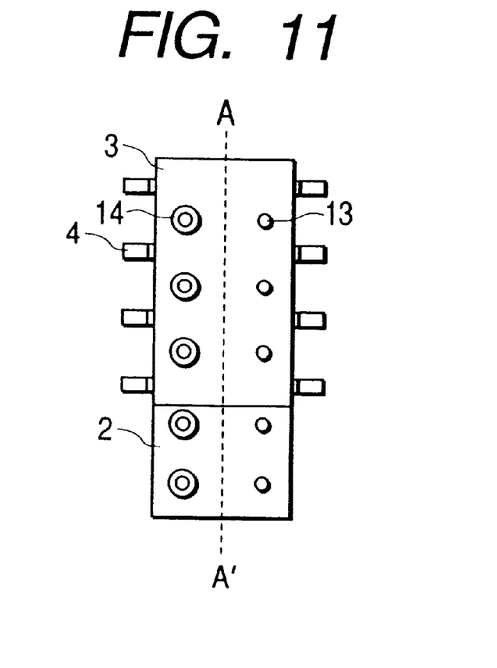
FIG. 11 is a bottom view of one embodiment of the optical module according to the present invention.
Figure 12:
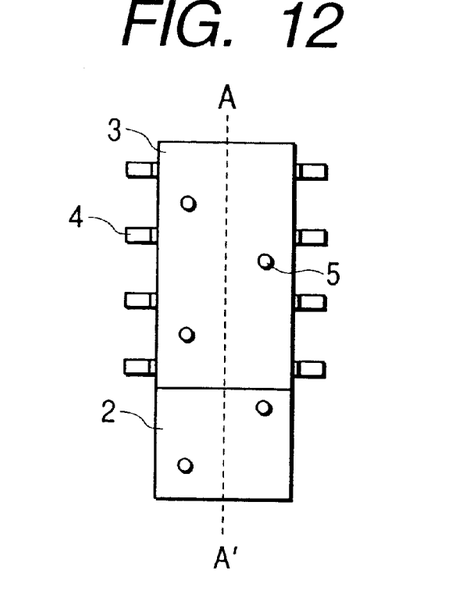
FIG. 12 is a bottom view of one embodiment of the optical module according to the present invention.
Figure 13:
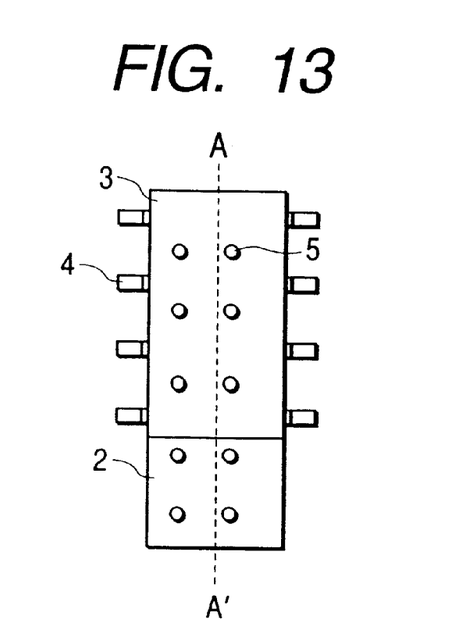
FIG. 13 is a bottom view of one embodiment of the optical module according to the present invention.

(9) For the configuration of the mutually fitting studs, it is possible to adopt a configuration where the stud parts 13 and the stud parts 14 are arranged at symmetrical locations with respect to a central axis A–A' of the optical module, as shown in FIG. 10 and FIG. 11. Moreover, as shown in FIG. 12 and FIG. 13, it is also possible to adopt a configuration where the stud parts 5 are not arranged symmetrically with respect to the central axis A–A'of the optical module.

Figure 14:
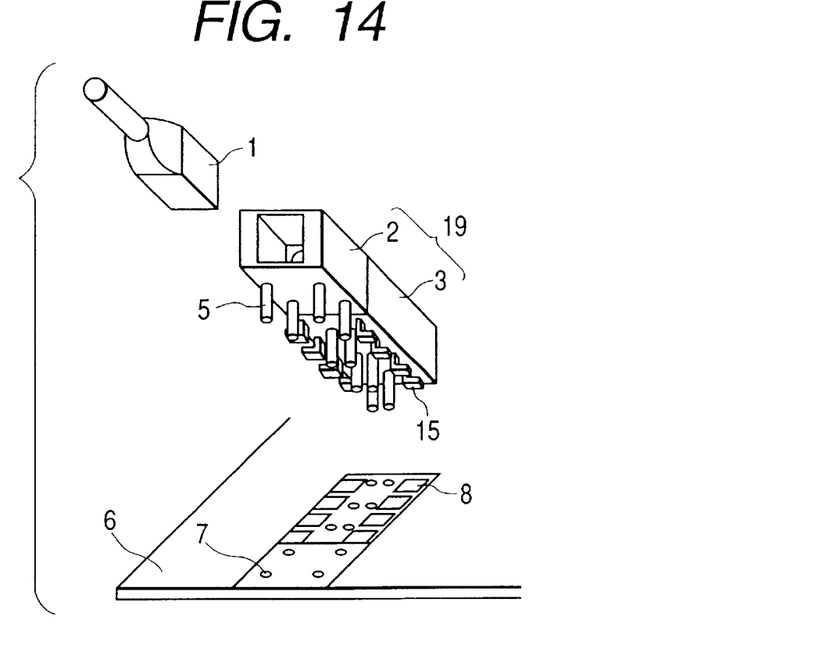
FIG. 14 is an exploded perspective view of one embodiment of the optical module according to the present invention.
Figure 15:
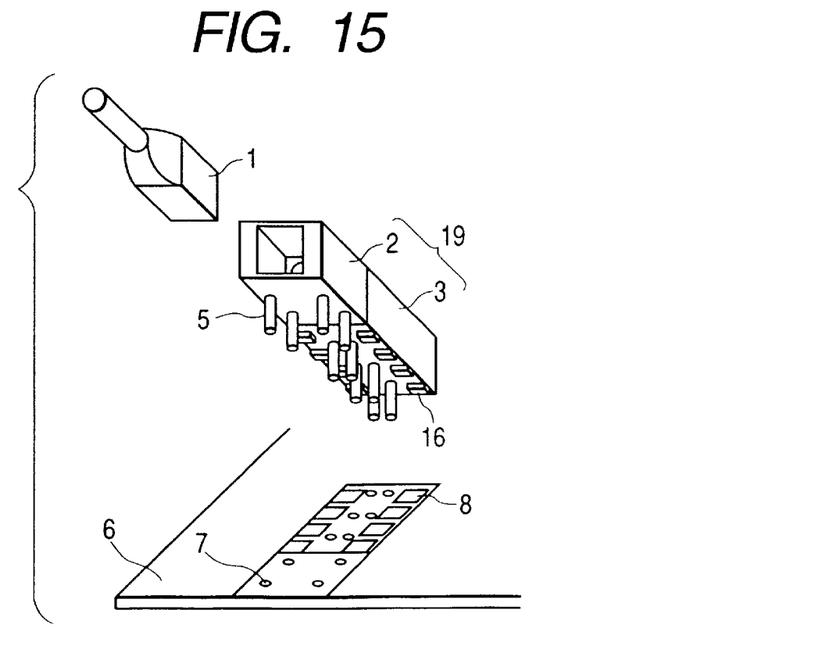
FIG. 15 is an exploded perspective view of one embodiment of the optical module according to the present invention.

(10) As shown in FIG. 3, it is possible to adopt a configuration where the electric terminals 4 are led out through the sides of the optical module 19 as an electric terminal structure compliant with the surface mounting process or reflow mounting process. Moreover, as shown in FIG. 14 and 15, it is possible to adopt a configuration where lead-shaped electric terminals 15 or land-shaped electric terminals 16 protrude from the underside (or bottom face) of the optical module 19 as an electric terminal structure compliant with the surface mounting process or reflow mounting process.

Figure 16:
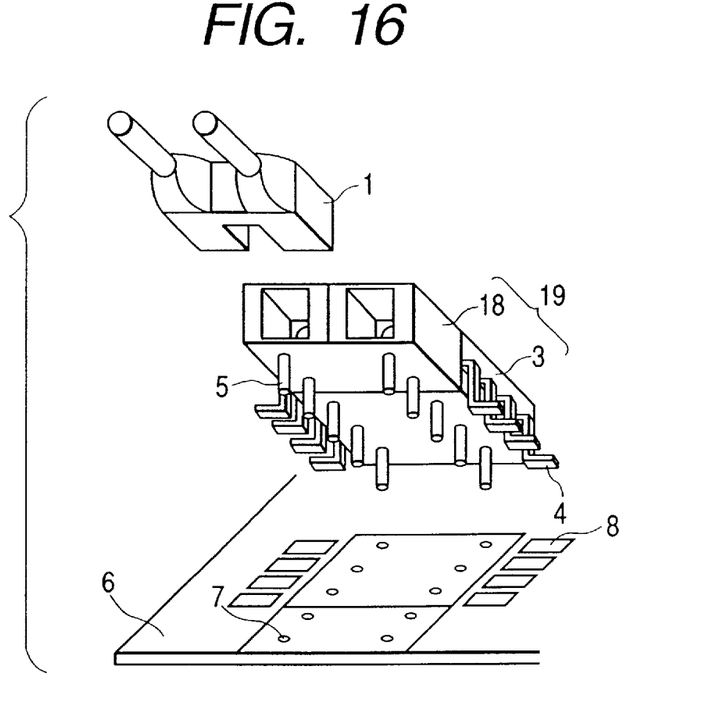
FIG. 16 is an exploded perspective view of one embodiment of the optical module according to the present invention.

(11) As shown in FIG. 16, it is also possible to adopt a structure where a multiplex receptacle part 18 consisting of a plurality of optical connection parts, that is, enabling a plurality of optical connectors to be attached thereto or detached therefrom, is provided so as to make possible the attachment/detachment of a plurality of discrete connectors or a multiplex connector 17.

Figure 17:
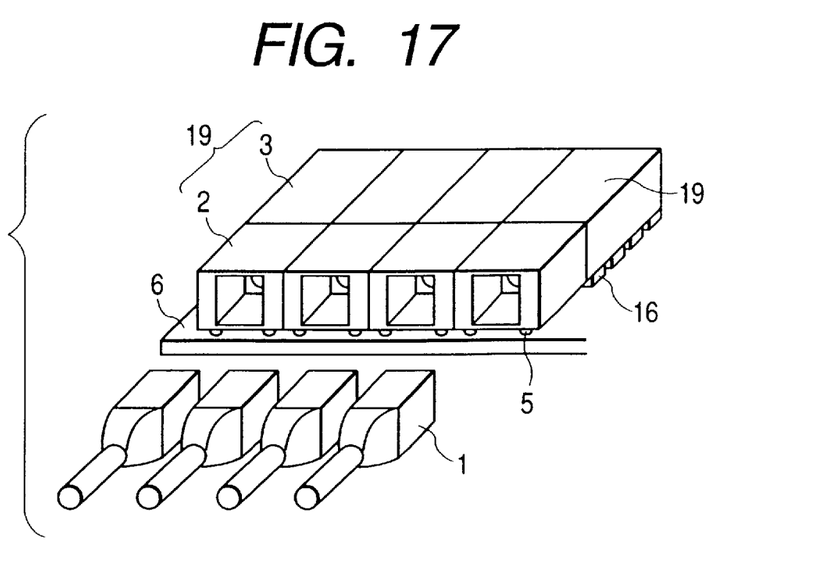
FIG. 17 is an exploded perspective view of one embodiment of optical communication equipment according to the present invention.

(12) As shown in FIG. 17, it is also possible to adopt a configuration where a plurality of optical modules 19 according to the present invention are mounted on the mount board 6.

Figure 18:
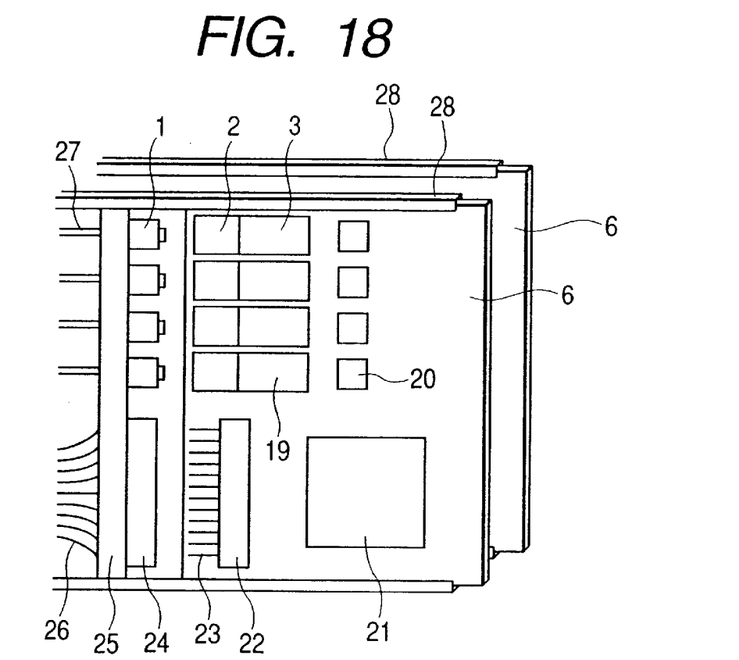
FIG. 18 is a perspective view of one embodiment of optical communication equipment according to the present invention.

(13) As shown in FIG. 18, it is also possible to adopt a configuration where electronic components, such as electronic circuits of the ICs 20 and 21, the electric connector 22 furnished with the electric terminal pins 23 for inputting/outputting electric signals from/to the outside, etc., as well as the optical module 19 according to the present invention are mounted on the same mount board 6.

Figure 19:
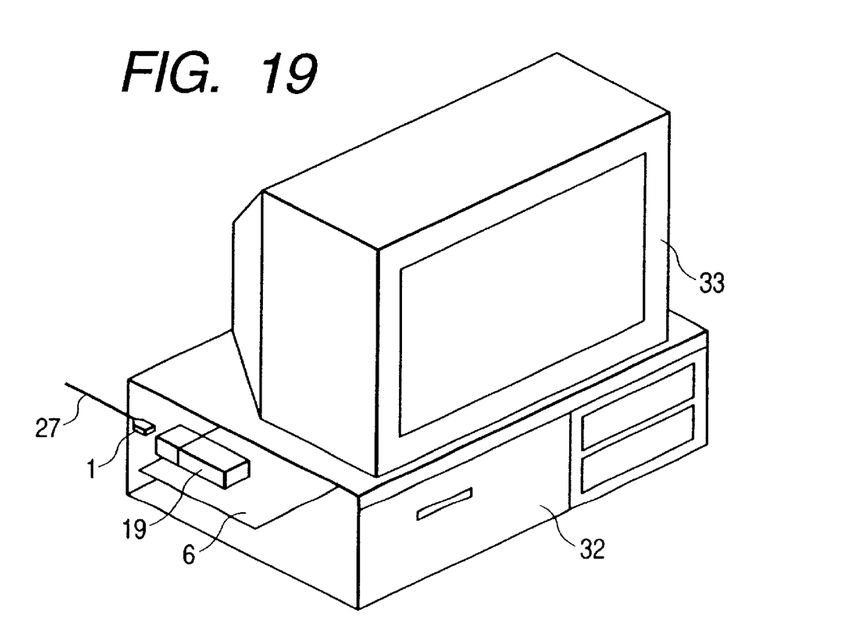
FIG. 19 is a perspective view of one embodiment of terminal equipment with the use of the optical communication equipment according to the present invention.

(14) As shown in FIG. 19, it is also possible to constitute terminal equipment 32 with the optical module 19 according to the embodiment of the present invention as communicating means of a network etc.

Figure 20:
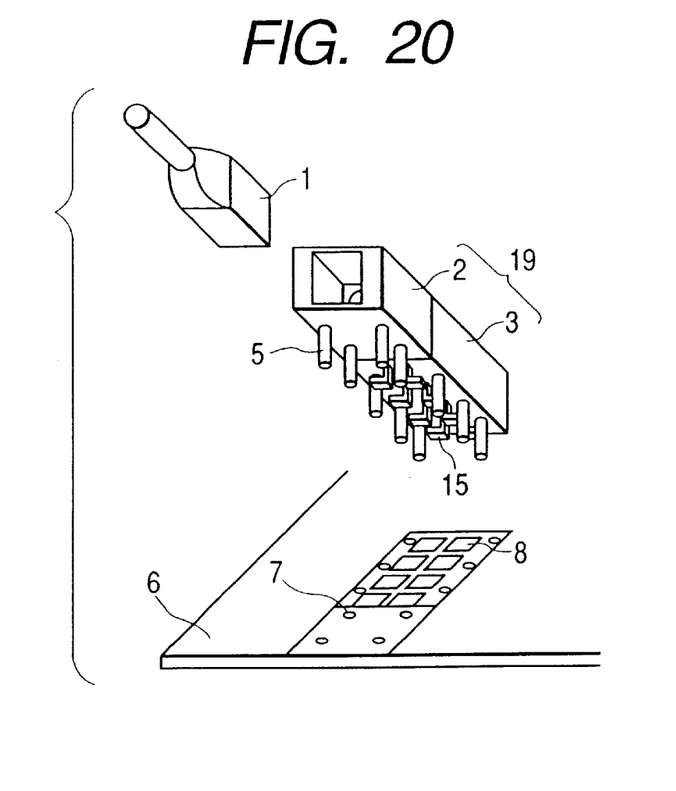
FIG. 20 is an exploded perspective view of one embodiment of the optical module according to the present invention.
Figure 21:
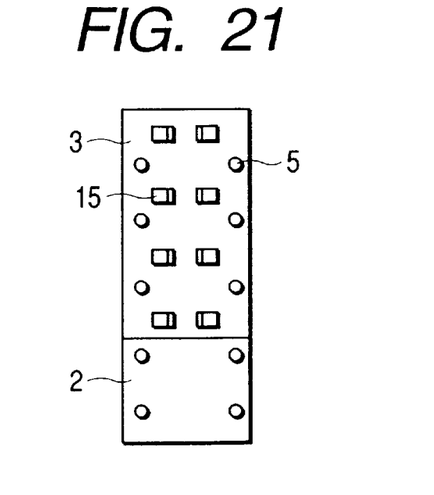
FIG. 21 is a bottom view of the one embodiment of the optical module according to the present invention.
Figure 22:
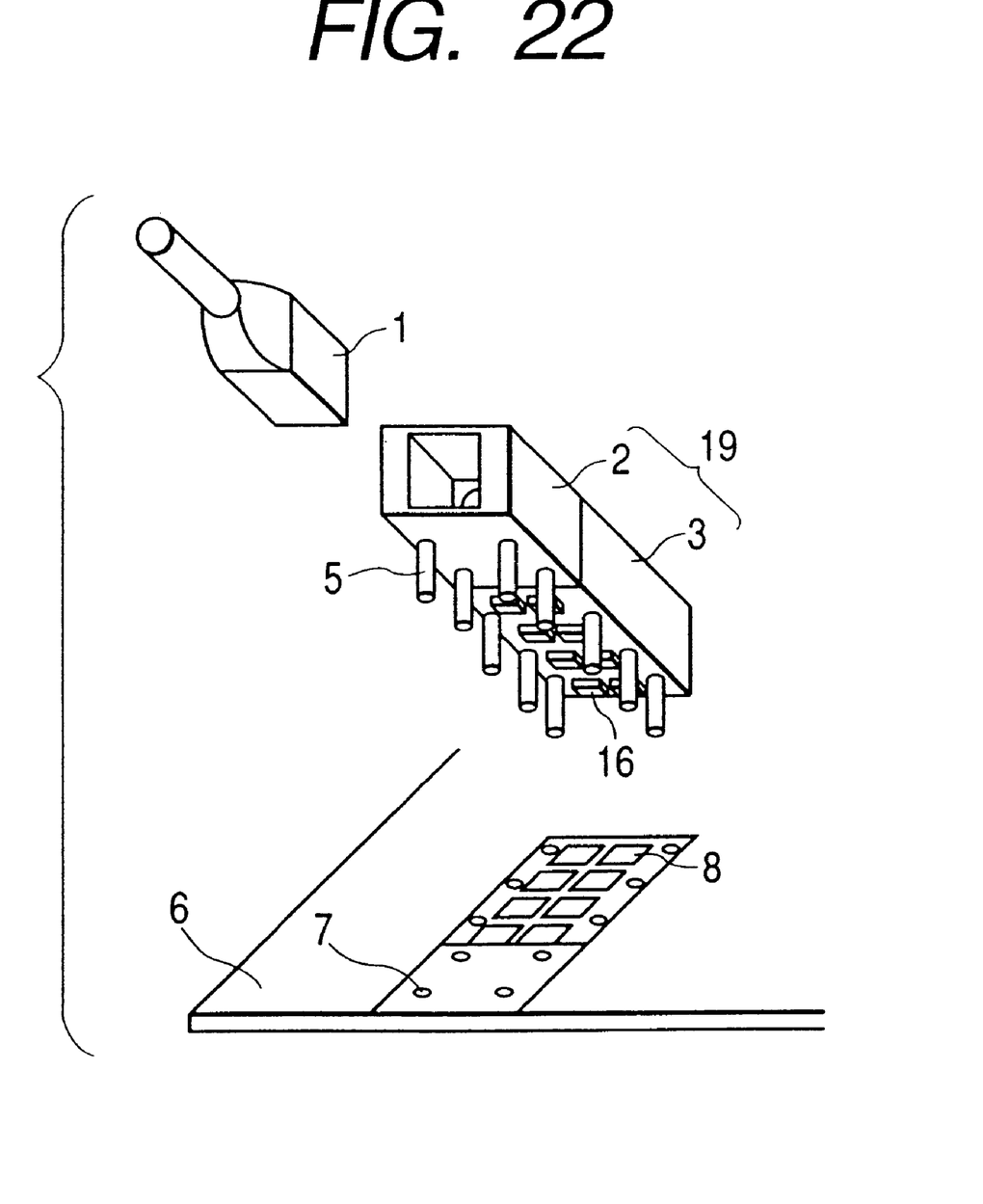
FIG. 22 is an exploded perspective view of one embodiment of the optical module according to the present invention.

(15) As shown in FIG. 20, FIG. 21, and FIG. 22, it is also possible to adopt a configuration where fixing stud parts are provided outside of an area defined by the lead-shaped electric terminals 15 or the land-shaped electric terminals 16 compliant with the surface mounting process or reflow mounting process.

BRIEF DESCRIPTION OF THE DRAWINGS

Other objects and advantages of the invention will become apparent during the following discussion of the accompanying drawings, wherein.

DESCRIPTION OF THE PREFERRED EMBODIMENTS

Hereafter, with reference to the drawings, embodiments according to the present invention will be described.

First Embodiment

FIG. 3 shows this embodiment, specifically presenting a perspective view of a solder reflow mounting type optical module constructed in such a way that an optical connector is detachably connected thereto, having a stud structure for securing itself to a mount board. The optical module 19 comprises a receptacle part 2 to which the optical connector 1 is detachably connected and electric terminals 4 for reflow mounting formed from lead frames led out through the sides of the optical module 19. On the mount board 6, lands 8 corresponding to the electric terminals 4 are formed. Moreover, on the undersides of the receptacle part 2 and the optical module main body 3 facing the mount board, cylindrical stud parts 5 are provided for fixing the module on the mount board; while, on the mount board 6, fixing holes 7 are provided to accommodate the stud parts 5. In the optical module main body 3, there are a semiconductor laser operating as a light source and a laser driver IC for driving the laser. The electric terminals 4 act mainly for inputting/outputting electric signals from/to the outside. With this structure, even when the mechanical fixation strength of the electric terminals 4 to the mount board is not necessarily sufficient, that is, when a load is applied to the optical module due to the force of attaching/detaching the optical connector 1, by making the studs 5 share the load, the possibility that the electric terminals 4 that were reflow mounted might be dislodged from the mount board can be reduced.

FIG. 4 is a partially cross sectional view showing how this optical module is mounted on the board at completion of the solder reflow mounting. The electric terminals 4 are soldered onto the lands 8 formed on the mount board 6 and the stud parts 5 are fitted into the fixing holes 7, whereby the optical module is secured to the mount board. Here, the relative displacement between the optical module and the mount board is sufficiently small; therefore high-precession mounting can be achieved depending on the machining accuracy of the stud parts 5 and the fixing holes 7.

With this structure, it is expected that the mechanical fixation strength of the optical module to the mount board after the reflow mounting will be sufficiently large, and, also, it is expected that deformation and degradation of the electric terminals 4 and the studs 5 due to the attachment/detachment of the optical connector will be sufficiently small. In the same way, it is expected that the same effect can be achieved in the other embodiments.

In this embodiment, it is possible to use a semiconductor laser as an optical device and a laser driver IC as an IC. It is also possible to use an optical device, such as an optical modulator, a photodiode, etc., and an IC, such as a preamplifier, a decision circuit, etc., in place of those or in addition to those. Moreover, the receptacle part 2, the optical module main body 3, and the stud parts 5 may be designed in a single structural combination, and, further, this member may be formed by molding with a plastic material or a resin material. In addition, it is expected that by providing three or more stud parts 5, the accuracy of the position and height of the optical module in the plane of the mount board will be improved.

In describing this embodiment, a case has been considered in which the electric terminals 4 for reflow mounting are formed from lead frames led out through the sides of the optical module 19. However, the electric terminals 15 or the planar electric terminals 16 that are arranged on the underside of the optical module 19 facing the mount board 6, as shown in the perspective view of FIG. 14, may be used as well.

In this embodiment, only one receptacle part 2 has been provided. However, as shown in the perspective structural drawing of FIG. 16, a multiplex receptacle part 18 consisting of two or more receptacles may be used, and, accordingly, a multiplex connector part 17 consisting of two or more connectors may be used as connectors. Moreover, a light transmitting and receiving function may be incorporated in the optical module 19. Furthermore, as an optical connector, an SC connector, an MU connector, an LC connector, an MT connector, and other specialized connectors may be used.

Second Embodiment

FIG. 5 is a view showing another embodiment according to the present invention. This embodiment is characterized in that the stud parts have tapered ends compared to the construction of FIG. 4. The other structural features are the same as those shown in FIG. 3 and FIG. 4. Components that have the same function as those in the other views are identified with the same numerals. On the undersides of the receptacle part 2 and the optical module main body 3 facing the mount board, there are stud parts 9 for fixing the module on amount board having a circular cone shape or a taper shape; and, on the mount board 6, fixing holes 7 are provided which accommodate the stud parts 9. Since the stud parts 9 have a taper structure, those members can be inserted into and fixed in the fixing holes 7 with only a slight insertion force. Furthermore, the height of the optical module above the mount board 6 can be controlled more accurately at completion of the reflow mounting.

Third Embodiment

FIG. 6 is a view showing a third embodiment according to the present invention. This embodiment is characterized in that the optical module has stud parts with a flange structure that will hold the mount board between flanges thereof. On the undersides of the receptacle part 2 and the optical module main body 3 facing the mount board 3, stud parts 10 for fixing the module on a mount board are provided. Each of the stud parts 10 has a flange structure for holding the mount board between the flanges thereof; and, on the mount board 6, fixing holes 7 are provided which accommodate the stud parts 10. Since each of the stud parts 10 has a flange structure for holding the mount board between the flanges thereof, by inserting the stud parts 10 into the fixing holes 7, this optical module can easily be secured on the mount board with respect to with a horizontal direction and a vertical direction. Further, with those studs, the height of the optical module above the mount board can be controlled accurately.

Fourth Embodiment

FIG. 7 is a view showing a fourth embodiment according to the present invention. This embodiment is characterized tn that the optical module has stud parts that are to be soldered to the lands on the mount board when being reflow mounted. The optical module 19 comprises a receptacle part 2 to which an optical connector is detachably attached and has electric terminals 4 for reflow mounting formed from lead frames led out through the sides of the optical module 19. The lands 8 corresponding to the electric terminals 4 are formed on the mount board 6. Moreover, on the undersides of the receptacle part 2 and the optical module main body 3 facing the mount board 6, stud parts 11 are provided for securing the module to a mount board that are to be solder fixed to the lands 12 on the mount board 6; and, on the mount board 6, fixing holes 7 are provided which accommodate the stud parts 10 and the lands 12 surrounding the fixing holes 7. The stud parts 11 are solder fixed by the lands 12 on the mount board 6 and the height of those member is controlled precisely when inserting them into the fixing holes 7.

Fifth Embodiment

FIG. 8 is a perspective view of a fifth embodiment according to the present invention. More specifically, the embodiment concerns a solder reflow mounting type optical module, to which an optical connector is detachably attached, having a stud structure for fixation that enables the optical modules to be mounted on a mount board from both sides. The optical module 19 comprises a receptacle part 2 to which an optical connector 1 is detachably attached and has electric terminals 4 for reflow mounting formed from lead frames led out through the sides of the optical module 19. The lands 8 corresponding to electric terminals 4 are formed in the mount board 6. Further, on the undersides of the receptacle part 2 and the optical module main body 3 facing the mount board, stud parts 13 and stud parts 14 are provided for fixing the module on a mount board, wherein the stud parts 10 and stud parts 14 are to fit mutually when coming face to face. On the mount board 6, fixing holes 7 are provided which accommodate the stud parts 13 and the stud parts 14. In the optical module main body 3, there are a semiconductor laser serving as a light source and a laser driver IC for driving the laser. FIG. 10 is an example of the underside structural view of this fifth embodiment. The studs 13 and the studs 14 are arranged at symmetrical positions with respect to the central axis A–A' of the optical module in an alternate manner.

FIG. 9 shows a front view of the two optical modules mounted on a single mount board 6 by the solder reflow process with a cross section of the mount board 6. In the mounting, first, the optical modules are mounted in the mount board 6 from the front side and from the rear side thereof, and the studs 13 and the studs 14 of the two modules are made to fit mutually via the fixing holes 7. Then, the optical modules are reflow mounted. After the reflow mounting, there is no variation of the relative position between the optical module and the mount board 6, so that highly accurate position control can be carried out depending on the pitch accuracy of the stud parts 13 and 14 and the fixing holes 7.

With the construction described above, double surface mounting by the solder reflow process can be realized, and, consequently, the mounting area can be enlarged by approximately two times compared to the constructions of the other embodiments.

In this embodiment, the semiconductor laser serving as an optical device and the laser driver IC are used. However, the same effect can be expected when an optical device, such as an optical modulator, a photodiode, etc., and an IC such as a preamplifier, a discriminator etc., are used.

Moreover, as shown in FIG. 11, the same effect can be obtained when the studs 13 are arranged on one side of two symmetrical locations with respect to the central axis A–A' of the optical module and the studs 14 are arranged on the other side. Furthermore, as shown in FIG. 12 and FIG. 13, the same effect can be obtained when the stud parts 5 are arranged at locations that are not symmetrical with respect to the central axis A–A'.

Sixth Embodiment

FIG. 17 is a perspective view showing a sixth embodiment according to the present invention. More specifically, this embodiment concerns optical communication equipment in which a plurality of optical modules are mounted on the same mount board 6. Four optical modules according to this embodiment of the present invention, each comprising a receptacle part 2, an optical module main body 3, stud parts 5, and planar electric terminals 16, are disposed on the mount board 6 and reflow mounted.

It can be expected that the mechanical fixation strength of the optical module to the mount board 6 after the reflow mounting will be sufficiently large, and, also, it can be expected that the deformation and degradation of the electric terminals 16 and the studs due to the attachment/detachment of the optical connector will be sufficiently small.

Seventh Embodiment

FIG. 18 is a perspective view showing a seventh embodiment of the present invention. More specifically, this embodiment concerns optical communication equipment in which a plurality of optical modules according to another embodiment of the present invention, electronic components, etc. are mounted on the same mount board 6. The optical modules 19 each comprising the receptacle part 2 and the optical module main body 3 according to the present invention, as well as electronic components, such as ICs 20 and 21 etc., are reflow mounted collectively on the mount board 6. After that, an electric connector 22 having electric connection pins 23 for inputting/outputting electric-signals from/to an enclosure side is mounted on the mount board 6. At the enclosure side, optical connectors 1 for transmitting optical signals to an optical fiber 27 that are to be connected to the receptacle parts 2 of the optical module 19 according to the present invention and an electric connector 24 for making electric connection with electric connection pins 23 and passing electric signals to electric wiring 26 are supported by a connector fixation pillar 25. The above-described mount board 6 on which the optical module 19 according to the present invention and the electronic components have been mounted is inserted along enclosure slot guides 28, so that the optical connectors 1 on the enclosure side and the receptacle parts 2 on the mount board 6 are connected and the electric connector 22 on the enclosure side and the electric pins 23 on the mount board 6 are connected. With this structure, it can be expected that the mechanical fixation strength of the optical module to the mount board 6 at completion of the reflow mounting will be increased to a sufficiently large degree compared to conventional cases, and, also, it can be expected that deformation and degradation of the electric terminals and the studs due to the attachment/detachment of the connector will be suppressed to a sufficiently small amount. Moreover, it will be expected that degradation of an optical transmission characteristic also can be suppressed to a sufficiently small amount.

Consequently, mixed mounting of the optical modules and the electronic components at a low cost can be realized, and, hence, low-cost optical communication equipment can be manufactured.

Eighth Embodiment

FIG. 19 is a perspective view showing an eighth embodiment according to the present invention. More specifically, in this embodiment, wherein the optical communication equipment according to another embodiment is incorporated in the terminal equipment as a communicating means. A mount board 6, on which the optical module 19 according to the other embodiment of the present invention was mounted is incorporated in a terminals device consisting of a display 33 and a terminal equipment main body 32 as a data communication board. Communication of this terminal equipment to/from the outside is performed through an optical fiber 27, whose connector 1 is connected to the optical module 19. For example, when a video image is communicated with this terminal equipment, a high-definition video image can be received in real time.

Ninth Embodiment

FIG. 20 is a perspective view of one embodiment, according to the present invention, of a solder reflow mounting type optical module, to which an optical connector can be detachably connected, having a stud structure for securing the module to a mount board 6. The optical module main body 3 comprises a receptacle part 2 to which an optical connector 1 is detachably connected, and it has electric terminals 15 for reflow mounting that are taken out from the underside of the optical module main body 3. The lands 8 corresponding to the electric terminal 15 are formed on the mount board 6. Further, on the undersides of the receptacle part 2 and the optical module main body 3 facing the mount board, provided are cylindrical stud parts 5 provided for fixing the module on a mount board outside an area defined by the electric terminals 15; and, on the mount board 6, fixing holes 7 are provided which accommodate the stud parts 5. In the optical module 19, there are a semiconductor laser serving as a light source and a laser driver IC for driving the laser. FIG. 21 shows a bottom view of the module, where the cylindrical stud parts 5 for securing the module to a mount board 6 are provided outside an area defined by the electric terminals 15.

In this embodiment, a semiconductor laser serving as an optical device and a laser driver IC are used. However, an optical device, such as an optical modulator, a photodiode, etc., and an IC, such as a preamplifier, a discriminator, etc., may be used to achieve the same effect. Moreover, the receptacle part 2, the optical module main body 3, and the stud parts 5 may be designed in a single structural combination. Further, this member may be formed by molding with a plastic material or a resin material to achieve the same effect. By providing three or more stud parts, the improvement of positional accuracy of the position and height of the optical module in the mount board 6 can be expected.

In the description of this embodiment, the electric terminals 15 are disposed so as to protrude from the underside of the optical module main body 3. However, planar electric terminals 16, as shown in the perspective structural drawing of FIG. 22, arranged on the underside of the optical module main body 3 facing the mount board 6, may be used to achieve the same effect.

In this embodiment, only one receptacle part 2 is provided. However, the same effect can be expected in a case where a multiplex receptacle part 18 consisting of two or more receptacle parts is used, as shown in the perspective structural drawing of FIG. 16, and, accordingly, a multiplex optical connector 17 can be used where plural optical connectors are needed. Moreover, the same effect can be expected in a case where a light transmitting and receiving function is built in the optical module 19. Furthermore, the same effect can be expected in a case where a connector, such as a SC connector, a MU connector, an LC connector, a MT connector, etc. or other specialized connector is used.

When the optical module and the optical communication equipment according to the present invention are used, the optical module can be reflow mounted on the mount board 6 together with various electric components, such as ICs etc., collectively, and troublesome processes, such as the reeling process on the mount board 6, the screw fastening process of the optical adapters etc., that may present problems which inhibit cost reduction can be eliminated. The position of the optical module depends on the machining accuracy of the stud fitting structure, and, therefore, it is possible to control the height and the position in the mount board 6 with high accuracy. By virtue of this structure, the mechanical fixation strength of the optical module at the completion of its mounting on the mount board is improved, and, further, the attachment/detachment stress is suppressed even at the time of the attachment/detachment of a plurality of optical connectors or a multiplex connector, so that high reliability can be achieved. Moreover, since this method facilitates the constitution of a multiplex receptacle part, including its actual mounting on the mount board 6 in a parallel manner, high-speed optical wiring can be realized. Furthermore, it is possible to apply this mounting method to a mount board 6 having a multiplex optical connector that is inserted/removed along slot guides to facilitate the attachment/detachment between the mount board 6 and an enclosure of the optical communication equipment where the mechanical fixation strength of the optical module is required at the time of the attachment/detachment of the optical connector.

In terms of technological aspects, the construction of the optical modules to which the embodiments according to the present invention have relevance provides the following features.

1. An optical module comprising: a receptacle part for mating with a connector that transmits or/and receives an optical signal; an optical device; a plurality of electric terminals capable of being reflow mounted, and having members each of which is able to fit in the mount board; wherein the plurality of electric terminals are provided so as to form mutually parallel first and second lines, and the plurality of members are provided between the first and second lines adjacently or/and outside an area defined by those lines and at least in the vicinity of one line.

2. An optical module comprising: a receptacle constructed in such a way that an optical connector or an optical fiber is detachably attached thereto; an optical device; a plurality of electric terminals capable of being reflow mounted, and studs arranged so as to be adjacent to the electric terminals; characterized in that by fitting the studs in the mount board when the electric terminals are surface mounted on the mount board, part of the load applied to the optical module when the above-mentioned optical connector is attached to and detached from the receptacle part is shared by points where the studs fit in the mount board.

3. A board mounted optical module comprising: a receptacle part constructed in such a way that an optical connector or an optical fiber is detachably attached thereto; an optical device; a plurality of first electric terminals capable of being reflow mounted; and studs arranged adjacent to the electric terminals; characterized in that the optical module has a function for suppressing a dislodging of the electric terminals from the mount board due to a load resulting from the attaching/detaching of the optical connector or the optical fiber that is realized by the fitting of the studs in the mount board when the electric terminals are surface mounted to the mount board, the optical module is reflow mounted on the mount board that has second electric terminals for making electric connection with the first electric terminals and holes that are able to fit the studs, and the studs are made to fit the holes.

4. A board mounted optical module comprising: a receptacle part constructed in such a way that an optical connector or an end part of an optical fiber is detachably attached thereto; an optical device; a plurality of first electric terminals capable of being reflow mounted on a mount board; and a plurality of studs which are able to fit in the mount board; wherein said plurality of first electric terminals are provided so as to form a first line and a second line, and said studs of first and second optical modules on each of which said plurality of studs are provided between said first and second lines or/and outside an area defined by those lines, are provided so that when the first and second optical modules are reflow mounted on the same mount board so as to sandwich the board on both sides, said studs of the first and second optical modules that have fitted in said mount board further fit mutually.

5. A board mounted optical module, characterized by a plurality of optical modules comprising: a receptacle part constructed in such a way that an optical connector or an end of an optical fiber is detachably connected thereto; an optical device; a plurality of first electric terminals capable of being reflow mounted; and a plurality of studs which are able to fit in a mount board; wherein the plurality of first electric terminals are provided so as to form a first line and a second line, the plurality of studs of the optical module are provided between the first and second lines or/and outside an area defined by these lines, the plurality of optical modules are mounted adjacently on the mount board that has second electric terminals for making electric connection with the first electric terminals and holes that are able to fit the studs, and other electric circuit components are mounted on the mount board.

6. A board mounted optical module, characterized in comprising: a receptacle part constructed in such a way that an optical connector or an end of an optical fiber is detachably connected thereto; an optical device; a plurality of first electric terminals capable of being reflow mounted; and a plurality of studs able to fit in a mount board; wherein the plurality of first electric terminals are arranged so as to form a first line and a second line, the plurality of studs of the optical module are provided between the first and second lines or/and outside an area defined by these lines, the plurality of optical module are mounted adjacently on the mount board that has second electric terminals for making electric connection with the first electric terminals and holes to fit the studs, other electric circuit components are mounted on the mount board, and the receptacle parts of the plurality of optical modules are provided at such locations that the receptacle parts can mate with the optical connectors or the ends of the optical fibers which are fixed on the other mount board.

According to the embodiments of the present invention, it is possible to provide optical modules etc. that can be reflow mounted on a mount board together with electronic components and at the same time can secure a mechanical strength that can bear a large stress at the time of the attachment/detachment of the optical fiber.

Although the invention has been described in its preferred form with a certain degree of particularity, it is understood that the present disclosure of the preferred form has been changed as to the details of construction, and a combination and arrangement of parts may be resorted to without departing from the spirit and the scope of the invention as hereinafter claimed.

What is claimed is:

1. An optical module comprising:
   (a) a receptacle part constructed in such a way that an optical connector or an end part of an optical fiber is detachably attached thereto;
   (b) an optical device;
   (c) a plurality of electric terminals capable of being reflow mounted; and
   (d) a plurality of studs that are able to fit in a mount board;
   wherein the plurality of electric terminals are provided in lines to form a first line of plural electric terminals and a second line of plural electric terminals, the plurality of studs are provided at least one of between the first and second lines and outside an area defined by at least one of the first and second lines and an extension thereof, and the studs are constructed in such a way that, when first and second optical modules are mounted on the same mount board so as to sandwich the mount board from both sides, underside to underside, ones of the studs of the first and second optical modules that have fitted holes fit together with others of the studs of the first and second modules through the mount board.

2. An optical module assembly comprising:
   first and second optical modules, each optical module including
   (a) a receptacle part constructed in such a way that an optical connector or an end part of an optical fiber is detachably attached thereto,
   (b) an optical device,
   (c) a plurality of electric terminals capable of being reflow mounted, and
   (d) a plurality of studs that are able to fit in a mount board, ones of the plurality of studs being substantially solid and others of the plurality of studs being substantially hollow;
   wherein the plurality of electric terminals are provided in lines to form a first line of plural electric terminals and a second line of plural electric terminals; and
   wherein the plurality of studs are provided at least one of between the first and second lines and outside an area defined by at least one of the first and second lines and an extension thereof, and when the first and second optical modules are mounted on the same mount board so as to sandwich the mount board from both sides, an underside of the first optical module to an underside of the second optical module, the others of the plurality of studs of the first and second optical modules that are substantially hollow fit together with the ones of the plurality of studs of the first and second modules that are substantially solid so that the ones of the plurality of studs are received within a hollow portion of the others of the plurality of studs through the mount board.

* * * * *